(12) United States Patent
Lee (10) Patent No.: US 10,549,603 B2
(45) Date of Patent: Feb. 4, 2020

(54) COOLANT CONTROL VALVE UNIT, AND COOLING SYSTEM HAVING THE SAME

(71) Applicants: Hyundai Motor Company, Seoul (KR); Kia Motors Corporation, Seoul (KR)

(72) Inventor: Hyo Jo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 69 days.

(21) Appl. No.: 16/014,943

(22) Filed: Jun. 21, 2018

(65) Prior Publication Data

US 2019/0160913 A1 May 30, 2019

(30) Foreign Application Priority Data

Nov. 29, 2017 (KR) .................. 10-2017-0161360

(51) Int. Cl.
| | |
|---|---|
| *F16K 1/42* | (2006.01) |
| *F01P 7/00* | (2006.01) |
| *B60H 1/00* | (2006.01) |
| *F01P 7/16* | (2006.01) |
| *F01P 7/08* | (2006.01) |
| *F01P 3/02* | (2006.01) |
| *F01P 11/06* | (2006.01) |
| *F01P 7/14* | (2006.01) |

(52) U.S. Cl.
CPC ............ *B60H 1/00885* (2013.01); *F01P 3/02* (2013.01); *F01P 7/08* (2013.01); *F01P 7/165* (2013.01); *F16K 1/42* (2013.01); *F01P 2003/024* (2013.01); *F01P 2003/027* (2013.01); *F01P 2007/146* (2013.01); *F01P 2011/063* (2013.01); *F01P 2025/13* (2013.01); *F01P 2025/32* (2013.01); *F01P 2050/22* (2013.01)

(58) Field of Classification Search
CPC . B60H 1/00885; F01P 7/165; F01P 2007/146; F01P 3/02; F01P 7/08; F02M 26/66; F02M 63/0035; F16K 1/42; F16K 1/44; F16K 3/26; F16K 3/00; F16K 39/02; F16K 39/04; F01D 17/105
See application file for complete search history.

(56) References Cited

U.S. PATENT DOCUMENTS

| | | | |
|---|---|---|---|
| 2003/0019528 A1* | 1/2003 | Cotte | F15C 5/00 |
| | | | 137/528 |
| 2012/0312010 A1* | 12/2012 | Yasoshima | F01D 17/105 |
| | | | 60/602 |

FOREIGN PATENT DOCUMENTS

KR 20100117909 A 11/2010

* cited by examiner

*Primary Examiner* — Jacob M Amick
(74) *Attorney, Agent, or Firm* — Mintz Levin Cohn Ferris Glovsky and Popeo, P.C.; Peter F. Corless (57) ABSTRACT

A coolant control valve unit includes a wall including a passage disposed at a predetermined position from one surface to another surface, a valve disposed to be inserted into the passage and open and close the passage according to a movement position, and an actuator opening and closing the passage through the valve by pushing or pulling the valve by using a stem connected with the valve, wherein one side and another side of the wall are formed to have a height difference in a movement direction or in an opposite movement direction so that a portion of the passage is opened and a remaining part of the passage is closed by the valve when the valve moves along the passage.

15 Claims, 12 Drawing Sheets

COOLANT CONTROL VALVE UNIT, AND COOLING SYSTEM HAVING THE SAME

CROSS-REFERENCE TO RELATED APPLICATION

This application claims under 35 U.S.C. § 119(a) the benefit of Korean Patent Application No. 10-2017-0161360 filed in the Korean Intellectual Property Office on Nov. 29, 2017, the entire contents of which are incorporated herein by reference.

BACKGROUND

(a) Technical Field

The present disclosure relates to a valve unit, more particularly, to a precise flow rate control valve unit that precisely controls a flow rate of coolant to control a temperature of a cooling object more precisely, and an engine cooling system having the same.

(b) Description of the Related Art

An engine generates torque by burning fuel, and exhausts combustion gas to the outside through an exhaust line. In particular, a coolant absorbs heat energy while circulating through the engine, and dissipates the absorbed heat energy to the outside through a radiator.

In general, if a coolant temperature of the engine is low to elevate oil viscosity, it is typical that friction force and fuel consumption increase to make a quality of the exhaust gas poor.

In addition, if a temperature of the coolant of the engine is too high, knocking typically is generated, and an adjustment of an ignition timing to suppress generation of knocking may degrade performance of the engine. Also, if a temperature of a lubricant is too high, a lubricating operation may be degraded.

Thus, a single coolant control valve is applied to control several cooling elements such that a temperature of a coolant in a particular portion is maintained to be high and a temperature of the coolant in another portion is maintained to be low.

Meanwhile, when the coolant control valve unit operates, the flow rate of the coolant abruptly increases in an initial opening condition, and thus it is difficult to precisely control a temperature of cooling components. Accordingly, research has been undertaken of a structure for precisely controlling flow rate of the coolant in the initial opening condition.

The above information disclosed in this Background section is only for enhancement of understanding of the background of the disclosure and therefore it may contain information that does not form the prior art that is already known in this country to a person of ordinary skill in the art.

SUMMARY

An object of the present disclosure is to provide a precise flow rate control valve unit that precisely controls a flow rate of coolant to control a temperature of a cooling object more precisely in an initial opening condition when the coolant control valve unit operates, and an engine cooling system having the same.

A coolant control valve unit according to an exemplary embodiment of the present disclosure includes a wall including a passage disposed at a predetermined position from one surface to another (i.e., the other) surface, a valve disposed to be inserted into the passage and open and close the passage according to movement position, and an actuator opening and closing the passage through the valve by pushing or pulling the valve by using a stem connected with the valve, wherein one side and another (i.e., the other) side of the wall are formed to have a height difference in a movement direction or in an opposite movement direction so that a portion of the passage is opened and a remaining part of the passage is closed by the valve when the valve moves along the passage.

On the basis of the valve, one surface and the other surface of the wall formed at one side may have a first height H1 and a second height H2 from a reference line BL, respectively, and one surface and the other surface of the wall formed at the other side may have a third height H3 and a fourth height H4, respectively.

The third height H3 may be larger than the first height H1, the second height H2 may be larger than the third height H3, and the fourth height H4 may be larger than the second height H2.

A first thickness t1 which is a value obtained by subtracting the first height H1 from the second height H2 may be the same as a second thickness t2 which is a value obtained by subtracting the third height H3 from the fourth height H4.

The third height H3 may be larger than the first height H1, the second height H2 may be larger than the third height H3, and the second height H2 may be the same as the fourth height H4.

A first thickness t1 which is a value obtained by subtracting the first height H1 from the second height H2 may be larger than a second thickness t2 which is a value obtained by subtracting the third height H3 from the fourth height H4.

The coolant control valve unit according to an exemplary embodiment of the present disclosure may further include a sealing member installed at the valve and sliding along an interior circumference of the passage.

The sealing member may be installed in a groove formed at an exterior circumference of the valve.

The passage may be formed as a circular shape, and the valve may be formed as a circular shape according to the interior surface of the passage.

The passage may include a first passage and the second passage, the valve may include a first valve and a second valve, the stem may include a first stem and a second stem respectively connected with the first valve and the second valve, the actuator may be provided to push or pull the first stem and the second stem.

An engine cooling system according to an exemplary embodiment of the present disclosure may include a coolant control valve unit described above and a cylinder block disposed on a cylinder head. The coolant control valve unit may be supplied the coolant discharged from the cylinder head and the cylinder block.

A coolant control valve unit according to another exemplary embodiment of the present disclosure includes a wall including a passage disposed at a predetermined position from one side surface to the other side surface, a valve disposed to be inserted into the passage or withdrawn to open and close the passage, an actuator opening and closing the passage through the valve by pushing or pulling the valve, wherein an auxiliary passage leading from one side surface of the wall to one side of an interior circumference of the passage according to one side of an exterior circumference of the valve is formed.

A sealing member sliding along an interior surface of the passage may be installed at an exterior circumference of the valve facing an interior circumference of the passage, and the sealing member may slide to move from one side to the other side on the basis of an inlet of the auxiliary passage by movement of the valve.

The valve may include a first valve and a second valve, the stem may include a first stem and a second stem respectively connected with the first valve and the second valve, the actuator may be provided to push or pull the first stem and the second stem.

An engine cooling system according to another exemplary embodiment of the present disclosure may include a coolant control valve unit described above and a cylinder block disposed on a cylinder head. The coolant control valve unit may be supplied the coolant discharged from the cylinder head and the cylinder block. In particular, the coolant control valve unit of the engine cooling system may include a wall including a passage disposed at a predetermined position from one side surface to another side surface; a valve disposed to be inserted into the passage or withdrawn to open and close the passage; and an actuator opening and closing the passage through the valve by pushing or pulling the valve, where an auxiliary passage leading from one side surface of the wall to one side of an interior circumference of the passage according to one side of an exterior circumference of the valve is formed According to an exemplary embodiment of the present disclosure, the valve opens a portion of the passage and increases an opening rate successively in an initial condition which the coolant control valve starts to be opened. Accordingly, the flow rate of the coolant is not abruptly increased but slowly increased to be controlled more precisely during opening of the valve.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

Figure 1:
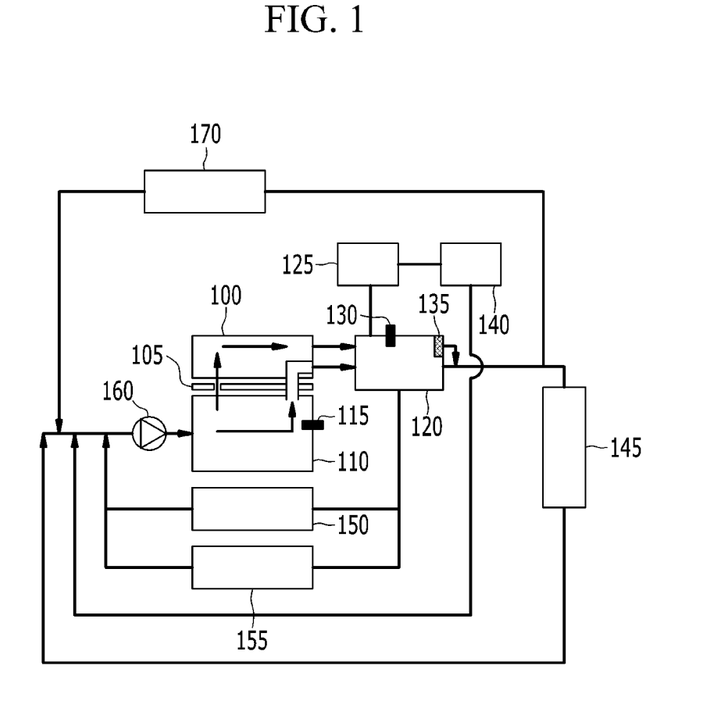
FIG. 1 is a block diagram of an engine cooling system according to an exemplary embodiment of the present disclosure.

FIG. 1 is a block diagram of an engine cooling system according to an exemplary embodiment of the present disclosure.

Referring to FIG. 1, an engine cooling system includes a cylinder head 100, a head gasket 105, a cylinder block 110, a block coolant temperature sensor 115, a coolant control valve unit 120, a valve coolant temperature sensor 130, a safety valve 135, a reservoir tank 170, a low EGR cooler 125, a heater 140, a radiator 145, an EGR valve 150, an oil cooler 155 and a coolant pump 160.

The cylinder head 100 is disposed on the cylinder block 110, and the head gasket 105 is interposed therebetween.

The coolant pump 160 is installed at one side of the cylinder block 110, and the coolant control valve unit 120 may be installed at the other side of the cylinder head 100.

Coolant pumped at the coolant pump 160 is supplied to an inner one side of the cylinder block 110, a portion of the coolant pumped to the cylinder block 110 passes through the head gasket 105 and be supplied to an inner one side of the cylinder head 100, and a remaining amount of the coolant flows to an inner other side of the cylinder block 110.

The coolant flowed to the inner other side of the cylinder block 110 rises to pass through the head gasket 105 and be supplied to the coolant control valve unit 120 installed at the other side of the cylinder head 100.

The coolant supplied to the inner one side of the cylinder head 100 flows to the inner other side of the cylinder head 100 and is supplied to the coolant control valve unit 120 installed at the other side of the cylinder head 100.

The coolant control valve unit 120 may control the coolant passing through the cylinder block 110 to be discharged, and the discharged coolant that passed through the cylinder head 100 always recirculates to the coolant control valve unit 120 according to operation of the coolant pump 160.

The block coolant temperature sensor 115 detecting a coolant temperature passing the cylinder block 110 is provided in the cylinder block 110, and the valve coolant temperature sensor 130 detecting coolant temperature passing the coolant control valve unit 120 in the coolant control valve unit 120.

The coolant control valve unit 120 controls the coolant distributed to the low pressure EGR cooler 125 and the heater 140, and controls the coolant distributed to the radiator 145, and always distributes the coolant to the low pressure EGR cooler 125 and the oil cooler 155.

The EGR line (not shown) is formed to be diverged from a downstream side of the turbocharger (not shown) and merged to an intake line, and the low pressure EGR cooler 125 is provided on the EGR line to cool the recirculation exhaust gas (EGR gas), and the heater 140 is provided to warm up indoor air of a vehicle.

The radiator 145 is disposed to radiate heat of the coolant to the outside, the EGR valve 150 controls a flow rate of the EGR gas in the EGR line, and the oil cooler 155 is disposed to cool the oil recirculating the engine.

In the coolant control valve unit 120, the reservoir tank 170 is disposed on a separate line diverged from a coolant line connected with the radiator 145, and the reservoir tank 170 collects bubbles contained in the coolant or supplements the coolant to the cooling system.

The safety valve 135 is a thermostat operating by a coolant temperature, and when the coolant control valve unit 120 is out of order and the coolant temperature is overheated, a bypass passage connected with the radiator 145 is opened. Accordingly, when the safety valve 135 operates, the coolant recirculates the radiator 145.

In an exemplary embodiment of the present disclosure, the coolant components are substantially for using coolant, and may include the cylinder head, a cylinder block, an oil cooler, an EGR cooler, a heater, a radiator, a transmission oil warmer, and an EGR valve etc.

Figure 2:
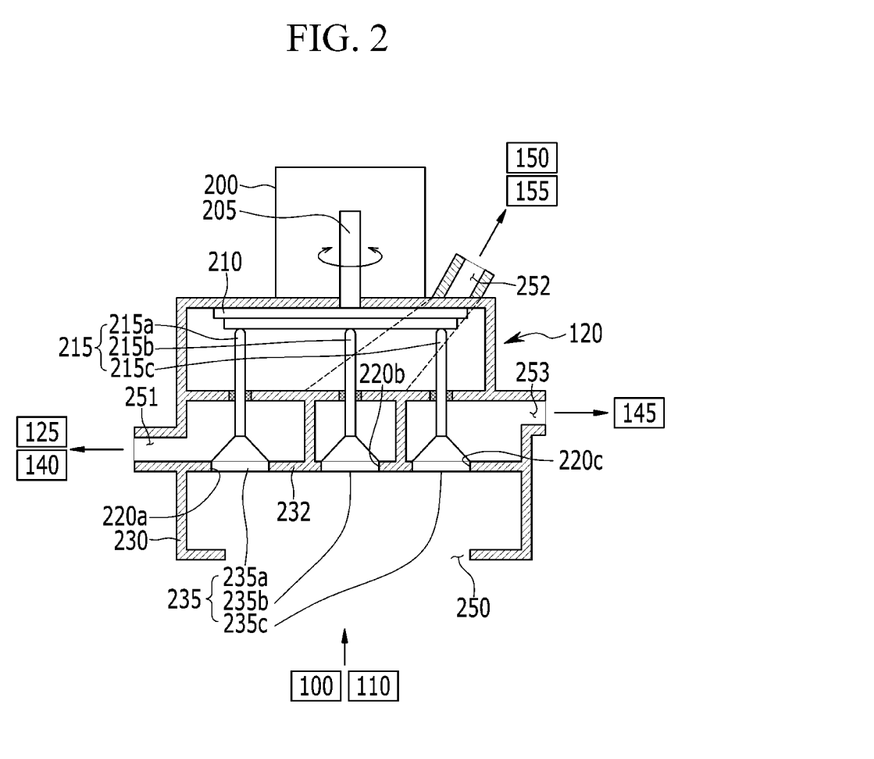
FIG. 2 is a cross-sectional view of a coolant control valve unit according to an exemplary embodiment of the present disclosure.

FIG. 2 is a cross-sectional view of a coolant control valve unit according to an exemplary embodiment of the present disclosure.

Referring to FIG. 2, the coolant control valve unit 120 includes a valve housing 230, a first passage 220a, a second passage 220b, a third passage 220c, a valve 235, a stem 215, a cam 210, a driving axle 205, an actuator 200, an inlet 250, a first outlet 251, a second outlet 252, a third outlet 253, and a wall 232.

The valve 235 may include a first valve 235a, a second valve 235b and a third valve 235c, and the stem 215 may include a first stem 215a, a second stem 215b and a third stem 215c.

Coolant is respectively supplied to the inlet 250 from the cylinder head 100 or the cylinder block 110, and the supplied coolant may be distributed to each coolant component through the first outlet 251, the second outlet 252 and the third outlet 253.

A first passage 220a, a second passage 220b and a third passage 220c are formed at the wall 232. The first valve 235a opens the first passage 220a to supply the coolant entered into the inlet 250 to the low pressure EGR cooler 125 and the heater 140. Here, the first, second and third passages 220a, 220b and 220c may be referred to a passage 220.

Further, the second valve 235b opens the second passage 220b to supply the coolant entered into the inlet 250 to the EGR valve 150 and the oil cooler 155. Further, the third valve 235c opens the third passage 220c to supply the coolant entered into the inlet 250 to the radiator 145.

A lower end of the first stem 215a is connected with a center portion of the upper surface of the first valve 235a, a lower end of the second stem 215b is connected with a center portion of the upper surface of the second valve 235b, and a lower end of the third stem 215c is connected with a center portion of the upper surface of the third valve 235c. In particular, the first stem 215a, the second stem 215b and the third stem 215c extend upwardly in parallel.

Each upper end of the first stem 215a, the second stem 215b and the third stem 215c is connected with lower surface of the cam 210, a lower end portion of the driving axle 205 is connected with a center portion of the upper surface, and the driving axle 205 extends upwardly.

The actuator 200 moves the first, second and third valves 235a, 235b and 235c upwards and downwards by the cam 210 and the first, second and third stems 215a, 215b and 215c. Accordingly, an opening rate of each of the first, second and third passages 220a, 220b and 220c may be controlled.

Figure 3:
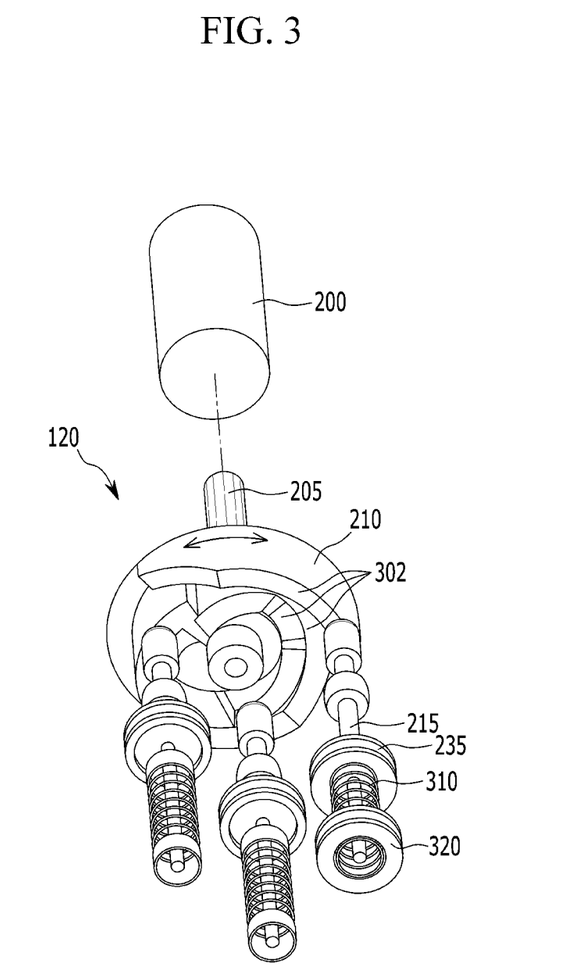
FIG. 3 is a partial perspective view of a coolant control valve unit according to an exemplary embodiment of the present disclosure.

FIG. 3 is a partial perspective view of a coolant control valve unit according to an exemplary embodiment of the present disclosure.

Referring to FIG. 3, the coolant control valve unit 120 includes an actuator 200, a driving axle 205, a cam 210, a pressing surface 302, a stem 215, valve 235, an elastic member 310 and a supporting unit 320.

The axle 205 is connected with a center portion of the upper surface of the cam 210, and the actuator 200 may rotate the cam 210 by the driving axle 25.

The pressing surface 302 is formed as three rows at the lower surface of the cam 210 on the basis of a center of rotation, and the stem 215 and valve 235 are formed corresponding to each pressing surface 302.

The upper end of the stem 215 contacts the pressing surface 302, the valve 235 is formed at one end of the stem 215, and the elastic member 310 elastically supports the lower surface of the valve 235 upwardly so that the stem 215 contacts the pressing surface 302.

Figure 4:
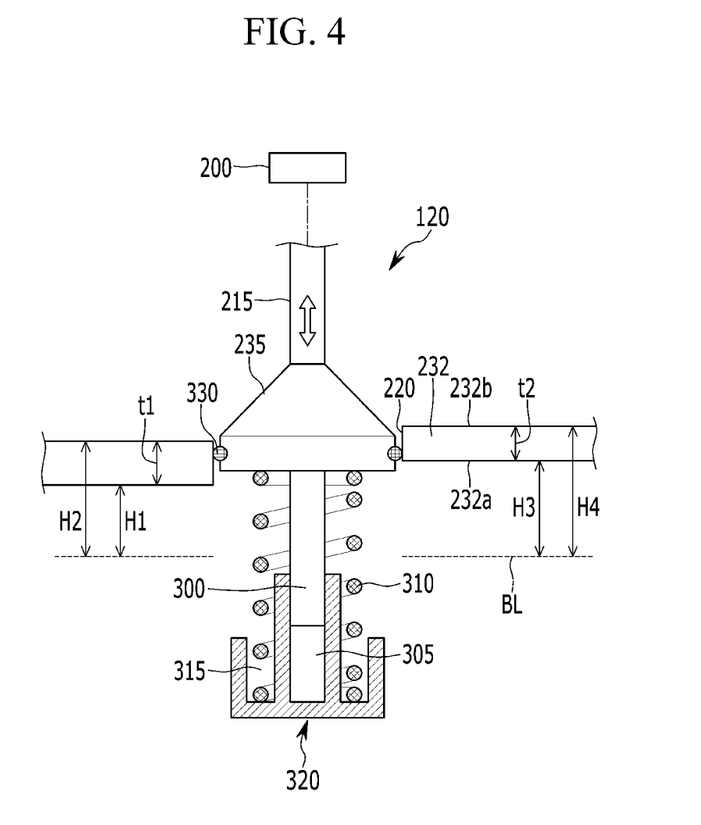
FIG. 4 is a cross-sectional view of a state that the valve closes the passage in the coolant control valve unit according to a first exemplary embodiment of the present disclosure.

FIG. 4 is a cross-sectional view of a state that the valve closes the passage in the coolant control valve unit according to a first exemplary embodiment of the present disclosure.

Referring to FIG. 4, the coolant control valve unit 120 includes a wall 232, a passage 220, a sealing member 330, a valve 235, a stem 215, a rod 300, an elastic member 310, a guide groove 305, an elastic member groove 315, a supporting unit 320 and an actuator 200.

The passage 220 is formed at one side of the wall 232, and a lower surface 232a and an upper surface 232b are formed at the wall 232, respectively. Referring to FIG. 4, it may be understood that the lower surface 232a is one surface, and the upper surface 232b is the other surface.

The valve 235 is inserted into inside of the passage 220, and the sealing member 330 is installed at an exterior circumference facing an interior circumference of the passage 220. Therefore, a sealing structure is realized.

A predetermined base line BL is formed at the lower portion of the wall 232, and a height of the lower surface 232a and the upper surface 232b of the wall 232 is set from the base line BL.

In particular, on the basis of the valve 235, the lower surface 232a of the wall 232 formed at one side has a first height H1, and the upper surface 232b of the wall 232 has a second height H2. A thickness of one side of the wall 232 is t1.

Further, on the basis of the valve 235, the lower surface 232a of the wall 232 formed at the other side has a third height H3, and the upper surface 232b of the wall 232 has a fourth height H4. A thickness of the other side of the wall 232 is t2, and the height may have relations such as the first height H1<the third height H3<the second height H2<the fourth height H4.

An upper end of the rod 300 is connected with a center portion of the lower surface of the valve 235, and the rod 300 extends in a predetermined distance downwardly.

The supporting unit 320 has a guide groove 305 into which a lower end of the rod 300 is inserted, and the elastic member groove 315 is formed at an exterior side of the guide groove 305.

The lower end of the elastic member 310 is inserted into the elastic member groove 315, and the upper end elastically supports the lower end of the valve 235.

Referring to FIG. 4, the valve 235 is disposed at a predetermined position by elastic force of the elastic member 310, and the sealing member 330 formed at the exterior circumference of the valve 235 is positioned between the second height H2 and the third height H3, and therefore the sealing member 330 of the valve 235 closes the passage 220.

In an exemplary embodiment of the present disclosure, the sealing member 330 installed at the valve 235 slides along the interior circumference of the passage 220. However, it is possible that the sealing member 330 is not installed at the valve 235, and the exterior circumference of the valve 235 directly slides along the interior circumference of the passage 220.

In addition, the sealing member 330 may be installed in a groove formed at the exterior circumference of the valve 235, and the exterior circumference of the valve 235 and the exterior circumference of the passage 220 may be formed as a circular shape.

Figure 5:
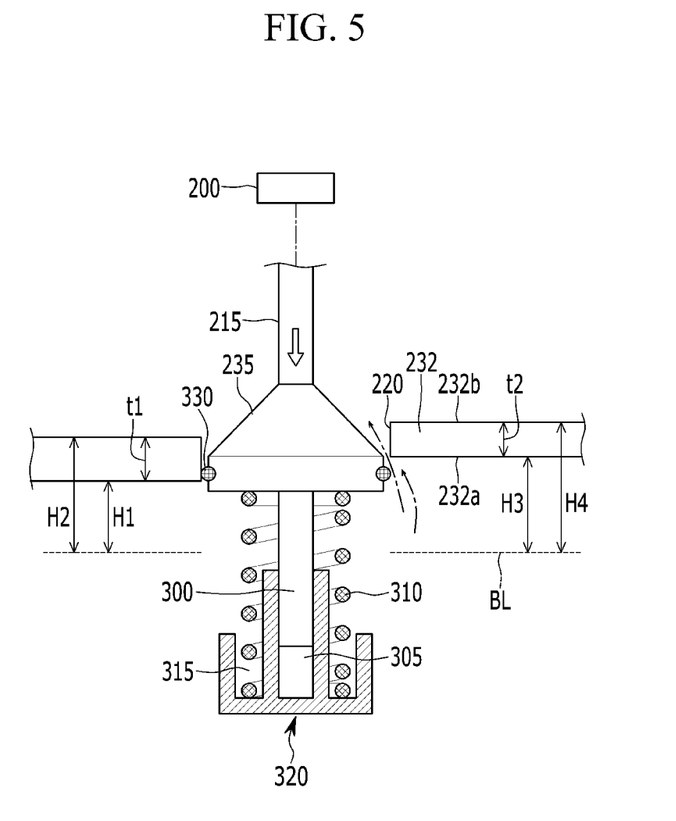
FIG. 5 is a cross-sectional view of a state that the valve opens a portion of the passage in the coolant control valve unit according to a first exemplary embodiment of the present disclosure.

FIG. 5 is a cross-sectional view of a state that the valve opens a portion of the passage in the coolant control valve unit according to a first exemplary embodiment of the present disclosure.

Referring to FIG. 5, initially, the actuator 200 moves the valve 235 downwards by the stem 215.

Accordingly, one side of the sealing member 330 installed at the valve 235 contacts the interior circumference of the passage 220, and the other side of the sealing member 330 is separated from the interior circumference of the passage 220. In other words, only a portion of the passage 220 is opened at the circumference of the valve 235.

Figure 6:
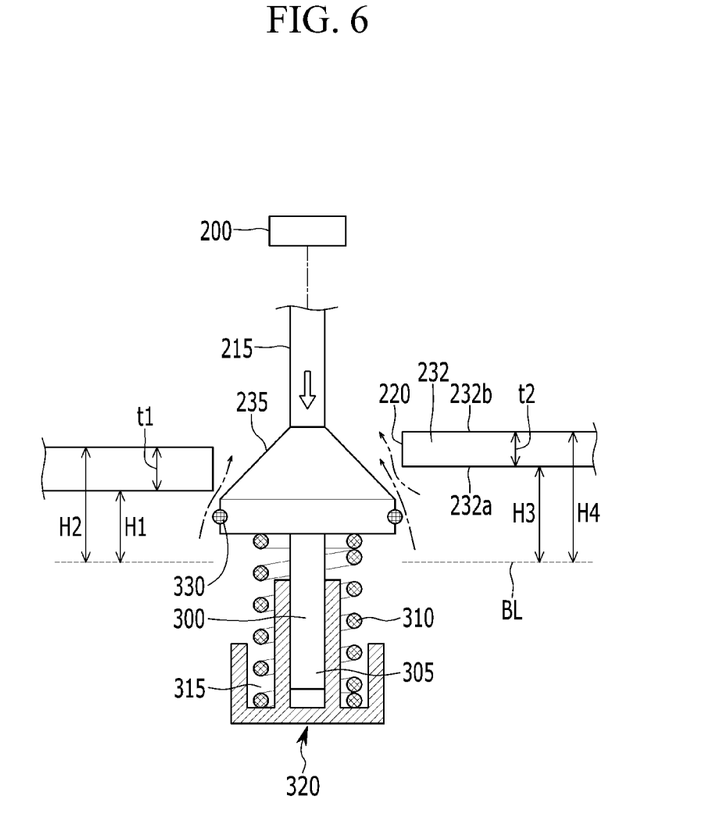
FIG. 6 is a cross-sectional view of a state that the valve opens the passage in the coolant control valve unit according to a first exemplary embodiment of the present disclosure.

FIG. 6 is a cross-sectional view of a state that the valve opens the passage in the coolant control valve unit according to a first exemplary embodiment of the present disclosure.

Referring to FIG. 6, secondly, the actuator 200 moves the valve 235 downwards by the stem 215.

Accordingly, one side of the sealing member 330 installed at the valve 235 is separated from the interior circumference of the passage 220, and the other side of the sealing member 330 is also separated from the interior circumference of the passage 220. In other words, the passage 220 is opened at the circumference of the valve 235.

Figure 7:
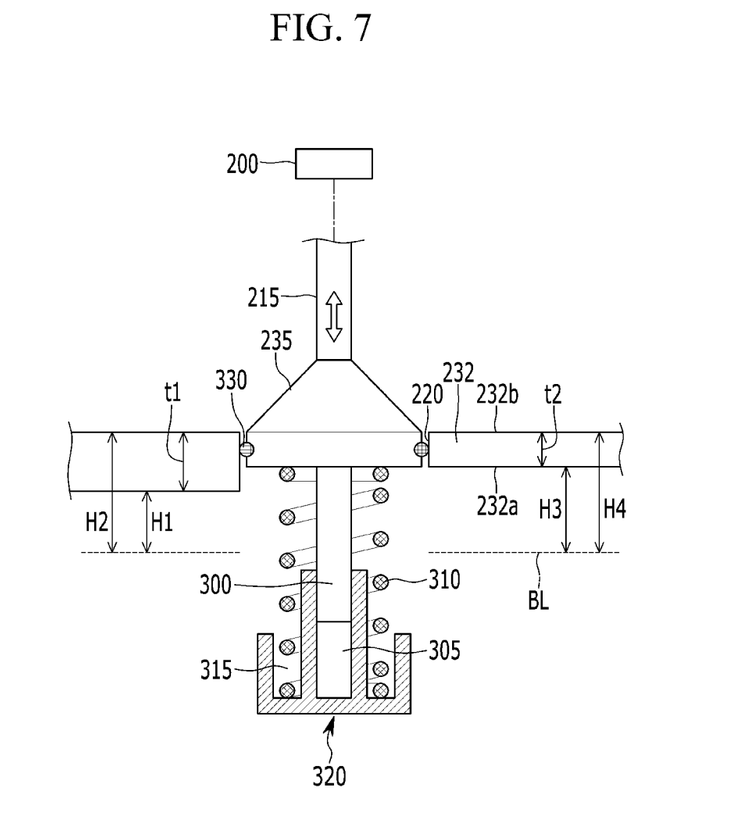
FIG. 7 is a cross-sectional view of a state that the valve closes the passage in the coolant control valve unit according to a second exemplary embodiment of the present disclosure.

FIG. 7 is a cross-sectional view of a state that the valve closes the passage in the coolant control valve unit according to a second exemplary embodiment of the present disclosure.

Referring to FIG. 7, the lower surface 232a of the wall 232 formed at one side on the basis of the valve 235 has a first height H1, and the upper surface 232b of the wall 232 has a second height H2. A thickness of one side of the wall 232 is t1.

Further, on the basis of the valve 235, the lower surface 232a of the wall 232 formed at the other side has a third height H3, and the upper surface 232b of the wall 232 has a fourth height H4. A thickness of the other side of the wall 232 is t2. The height may have relations such as the first height H1<the third height H3<the second height H2=the fourth height H4.

Referring to FIG. 7, the valve 235 is disposed at a predetermined position by elastic force of the elastic member 310, and the sealing member 330 formed at the exterior circumference of the valve 235 is positioned between the second height H2 and the third height H3, and therefore the valve 235 closes the passage 220.

Figure 8:
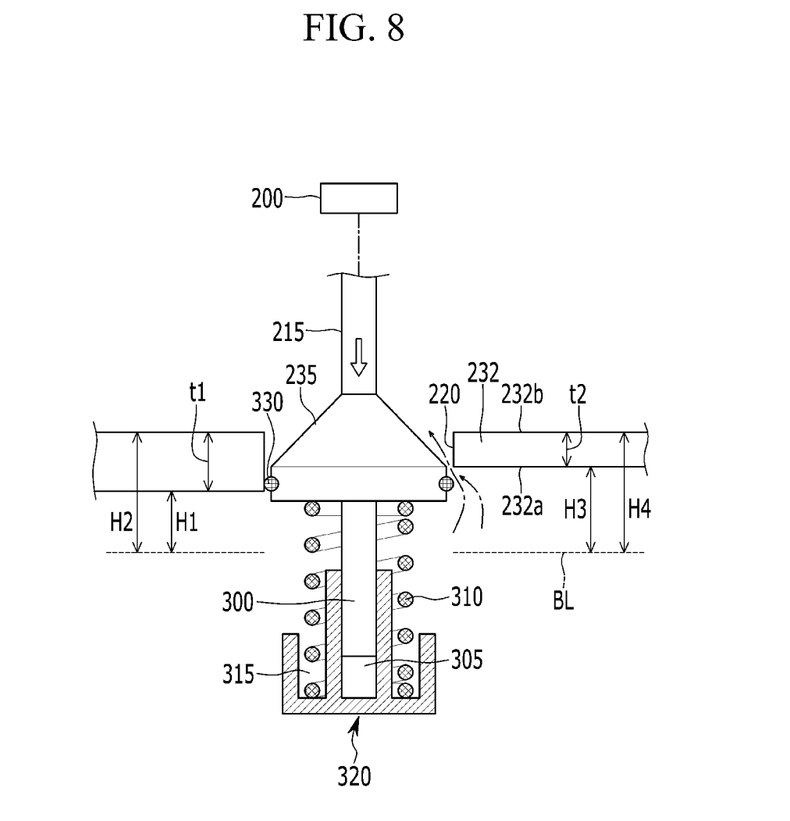
FIG. 8 is a cross-sectional view of a state that the valve opens a portion of the passage in the coolant control valve unit according to a second exemplary embodiment of the present disclosure.

FIG. 8 is a cross-sectional view of a state that the valve opens a portion of the passage in the coolant control valve unit according to a second exemplary embodiment of the present disclosure.

Referring to FIG. 8, initially, the actuator 200 moves the valve 235 downwards by the stem 215.

Accordingly, one side of the sealing member 330 installed at the valve 235 contacts the interior circumference of the passage 220, and the other side of the sealing member 330 is separated from the interior circumference of the passage 220. In other words, only a portion of the passage 220 is opened at the circumference of the valve 235.

Figure 9:
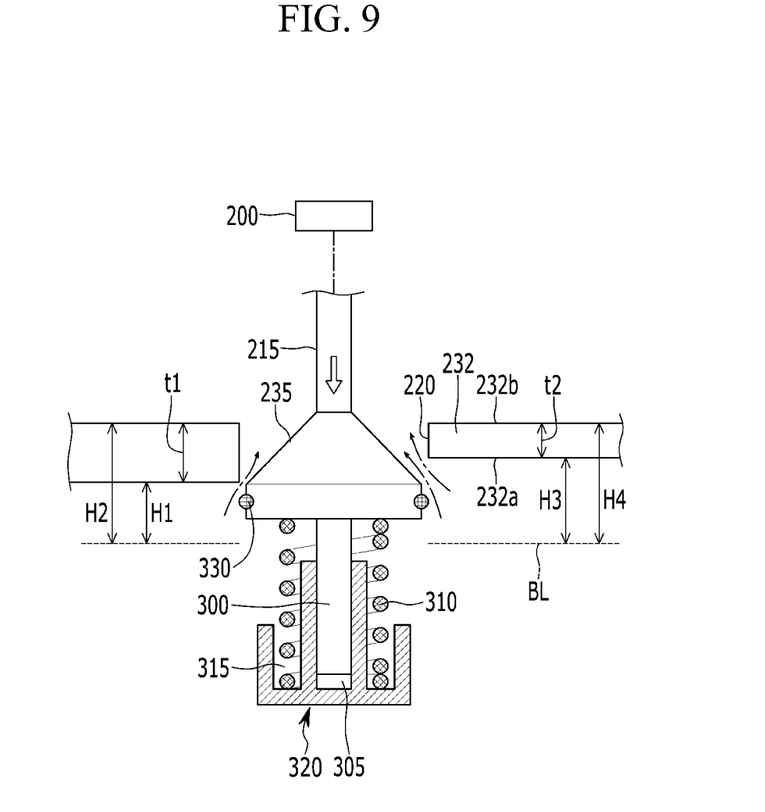
FIG. 9 is a cross-sectional view of a state that the valve opens the passage in the coolant control valve unit according to a second exemplary embodiment of the present disclosure.

FIG. 9 is a cross-sectional view of a state that the valve opens the passage in the coolant control valve unit according to a second exemplary embodiment of the present disclosure.

Referring to FIG. 9, secondly, the actuator 200 moves the valve 235 downwards by the stem 215.

Accordingly, one side of the sealing member 330 installed at the valve 235 is separated from the interior circumference of the passage 220, and the other side of the sealing member 330 is also separated from the interior circumference of the passage 220. In other words, the passage 220 is opened at the circumference of the valve 235.

Figure 10:
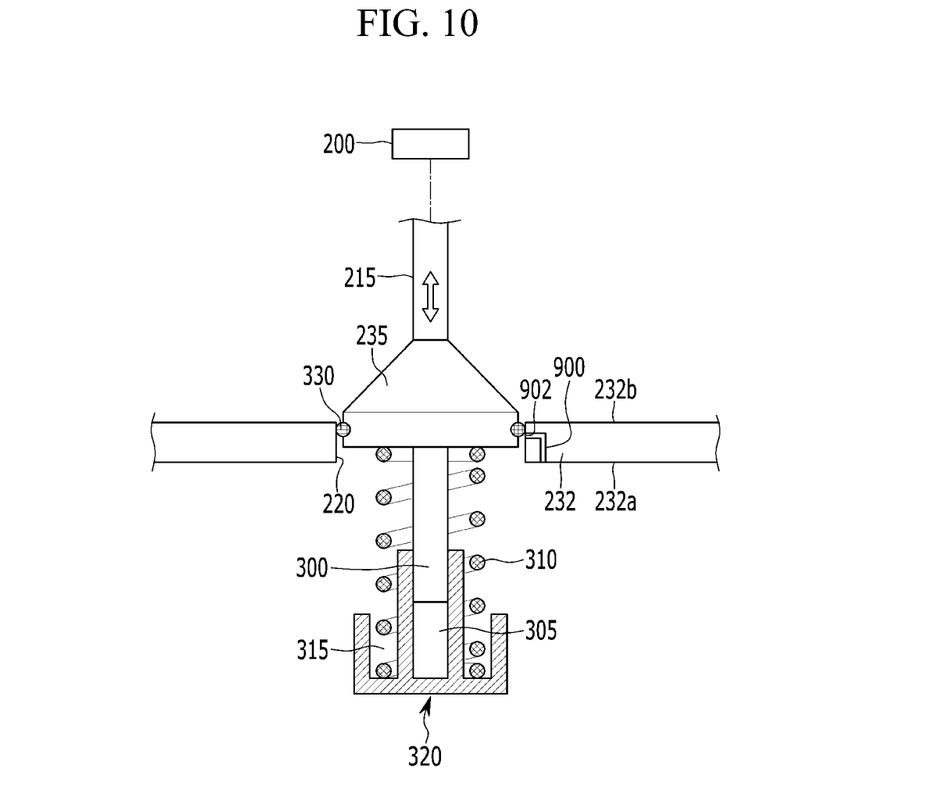
FIG. 10 is a cross-sectional view of a state that the valve closes the passage in the coolant control valve unit according to a third exemplary embodiment of the present disclosure.

FIG. 10 is a cross-sectional view of a state that the valve closes the passage in the coolant control valve unit according to a third exemplary embodiment of the present disclosure.

Referring to FIG. 10, the passage 220 is formed at one side of the wall 232, and a lower surface 232a and an upper surface 232b are formed at the wall 232, respectively. In particular, it may be understood that the lower surface 232a is one surface and the upper surface 232b is the other surface.

The valve 235 is inserted into inside of the passage 220, and the sealing member 330 is installed at an exterior circumference facing an interior circumference of the passage 220. Therefore, a sealing structure is realized.

An upper end of the rod 300 is connected with a center portion of the lower surface of the valve 235, and the rod 300 extends in a predetermined distance downwardly.

The supporting unit 320 has a guide groove 305 into which a lower end of the rod 300 is inserted, and the elastic member groove 315 is formed at an exterior side of the guide groove 305. Further, the lower end of the elastic member 310 is inserted into the elastic member groove 315, and the upper end elastically supports the lower end of the valve 235.

Referring to FIG. 10, an auxiliary passage 900 may be formed at the lower surface 232a of the wall 232 on the basis of the valve 235 toward one side of the interior circumference of the passage 220.

In an exemplary embodiment of the present disclosure, the valve 235 is supported upwards by the elastic member 310, and the sealing member 330 installed at the valve 235 slidably contacts the upper end of the auxiliary passage 900 at the interior circumference of the passage 220.

Accordingly, the valve 235 and the sealing member 330 close the whole passage 220, and therefore neither can flow through the auxiliary passage 900 the coolant.

In an exemplary embodiment of the present disclosure, the auxiliary passage 900 may also be formed toward one side of the interior circumference of the passage 220 at the upper surface of the wall 232.

Figure 11:
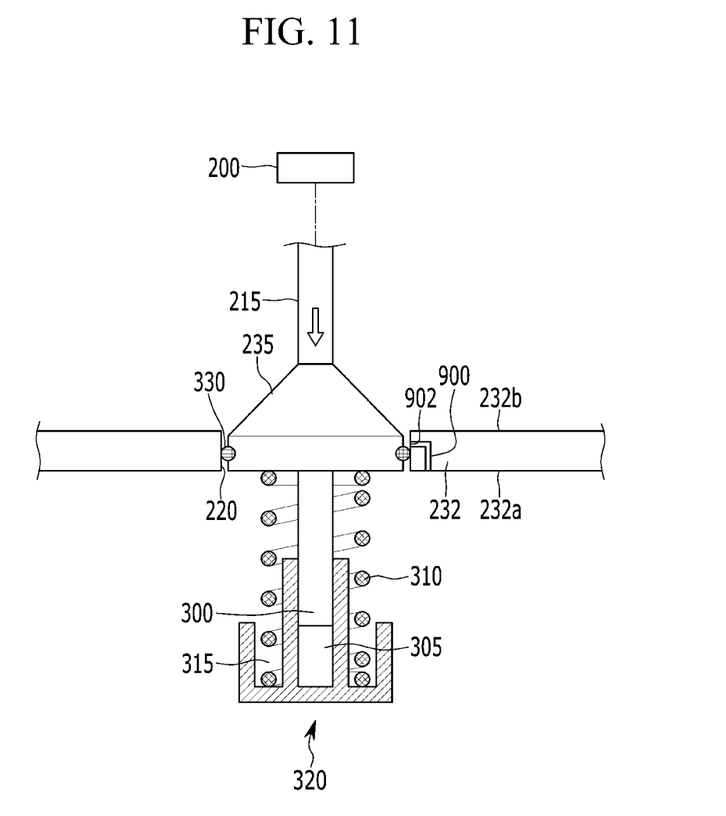
FIG. 11 is a cross-sectional view of a state that the valve opens a portion of the passage in the coolant control valve unit according to a third exemplary embodiment of the present disclosure.

FIG. 11 is a cross-sectional view of a state that the valve opens a portion of the passage in the coolant control valve unit according to a third exemplary embodiment of the present disclosure.

Referring to FIG. 11, when the actuator 200 initially moves the valve 235 downwards by the stem 215, the sealing member 330 installed at the valve 235 contacts the interior surface of the passage 220, and the sliding surface of the sealing member 330 is positioned at a lower portion of the auxiliary passage 900.

Accordingly, the valve 235 and the sealing member 330 close the passage 220, however, the lower portion and the upper portion of the wall 232 are connected with each other, and therefore the coolant in the lower portion of the wall 232 may flow slowly toward the upper portion of the wall 232 through the auxiliary passage 900.

Figure 12:
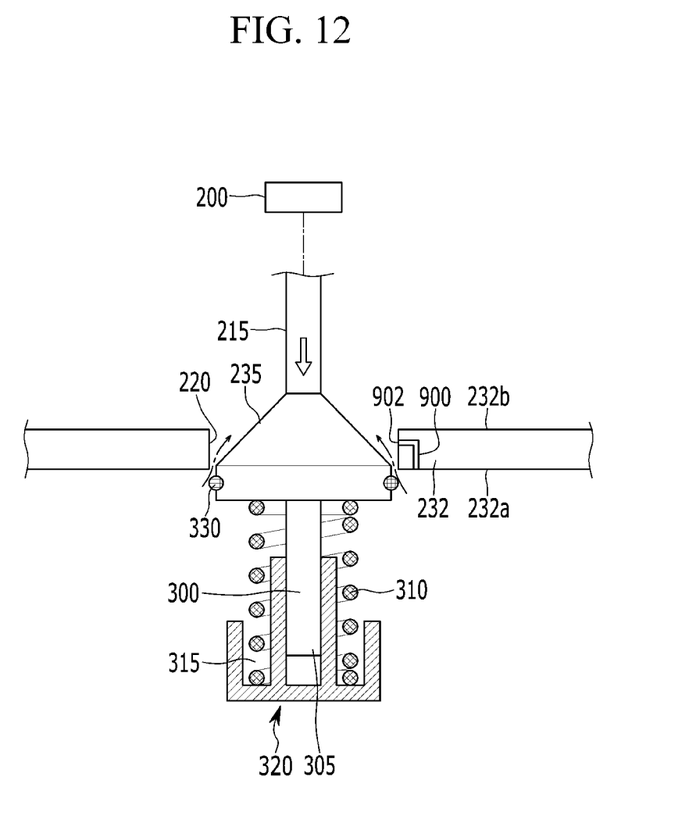
FIG. 12 is a cross-sectional view of a state that the valve opens the passage in the coolant control valve unit according to a third exemplary embodiment of the present disclosure.

FIG. 12 is a cross-sectional view of a state that the valve opens the passage in the coolant control valve unit according to a third exemplary embodiment of the present disclosure.

Referring to FIG. 12, when the actuator 200 secondly moves the valve 235 downwards by the stem 215, the sealing member 330 installed at the valve 235 is separated from the interior surface of the passage 220

Accordingly, the sealing member 330 opens the passage 220, the lower portion and the upper portion of the wall 232 are connected with each other by the auxiliary passage 900, and therefore the coolant in the lower portion of the wall 232 may flow rapidly toward the upper portion of the wall 232 through the auxiliary passage 900.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A coolant control valve unit, comprising:
 a wall including a passage disposed at a predetermined position from one surface to another surface;
 a valve disposed to be inserted into the passage and open and close the passage according to a movement position; and
 an actuator opening and closing the passage through the valve by pushing or pulling the valve by using a stem connected with the valve,
 wherein one side and another side of the wall are formed to have a height difference in a movement direction or in an opposite movement direction so that a portion of the passage is opened and a remaining part of the passage is closed by the valve when the valve moves along the passage.

2. The coolant control valve unit of claim 1, wherein:
 on the basis of the valve,
 the one surface and the another surface of the wall formed at the one side have a first height and a second height from a reference line, respectively, and
 the one surface and the another surface of the wall formed at the another side have a third height and a fourth height, respectively.

3. The coolant control valve unit of claim 2, wherein:
 the third height is larger than the first height, the second height is larger than the third height, and the fourth height is larger than the second height.

4. The coolant control valve unit of claim 3, wherein:
 a first thickness which is a value obtained by subtracting the first height from the second height is the same as a second thickness which is a value obtained by subtracting the third height from the fourth height.

5. The coolant control valve unit of claim 2, wherein:
 the third height is larger than the first height, the second height is larger than the third height, and the second height is the same as the fourth height.

6. The coolant control valve unit of claim 5, wherein:
 a first thickness which is a value obtained by subtracting the first height H1 from the second height H2 is larger than a second thickness t2 which is a value obtained by subtracting the third height H3 from the fourth height H4.

7. The coolant control valve unit of claim 1, further comprising:
 a sealing member installed at the valve and sliding along an interior circumference of the passage.

8. The coolant control valve unit of claim 7, wherein:
 the sealing member is installed in a groove formed at an exterior circumference of the valve.

9. The coolant control valve unit of claim 1, wherein:
 the passage is formed as a circular shape, and the valve is formed as a circular shape according to the interior surface of the passage.

10. The coolant control valve unit of claim 1, wherein:
 the passage includes a first passage and a second passage, the valve includes a first valve and a second valve, the stem includes a first stem and a second stem respectively connected with the first valve and the second valve, the actuator is provided to push or pull the first stem and the second stem.

11. An engine cooling system, comprising:

a cylinder block disposed on a cylinder head; and a coolant control valve unit of claim 1 to which the coolant discharged from the cylinder head and the cylinder block is supplied and distributing the coolant to cooling components.

12. A coolant control valve unit, comprising:

a wall including a passage disposed at a predetermined position from one side surface to another side surface;

a valve disposed to be inserted into the passage or withdrawn to open and close the passage; and an actuator opening and closing the passage through the valve by pushing or pulling the valve, wherein an auxiliary passage leading from one side surface of the wall to one side of an interior circumference of the passage according to one side of an exterior circumference of the valve is formed.

13. The coolant control valve unit of claim 12, wherein:

a sealing member sliding along an interior surface of the passage is installed at an exterior circumference of the valve facing an interior circumference of the passage, and the sealing member slides to move from one side to another side on the basis of an inlet of the auxiliary passage by movement of the valve.

14. The coolant control valve unit of claim 12, wherein:

the passage includes a first passage and a second passage, the valve includes a first valve and a second valve, the stem includes a first stem and a second stem respectively connected with the first valve and the second valve, the actuator is provided to push or pull the first stem and the second stem.

15. An engine cooling system, comprising:

a cylinder block disposed on a cylinder head; and a coolant control valve unit to which the coolant discharged from the cylinder head and the cylinder block is supplied and distributing the coolant to cooling components, the coolant control valve unit comprising:

a wall including a passage disposed at a predetermined position from one side surface to another side surface;

a valve disposed to be inserted into the passage or withdrawn to open and close the passage; and an actuator opening and closing the passage through the valve by pushing or pulling the valve, wherein an auxiliary passage leading from one side surface of the wall to one side of an interior circumference of the passage according to one side of an exterior circumference of the valve is formed.

\* \* \* \* \*